(No Model.)

H. BARKER.
GATE.

No. 453,534.  Patented June 2, 1891.

WITNESSES:
Paul Johot
E. M. Clark

INVENTOR:
Hiram Barker
BY Munn & Co.
ATTORNEYS

UNITED STATES PATENT OFFICE.

HIRAM BARKER, OF ST. JOSEPH, MISSOURI.

GATE.

SPECIFICATION forming part of Letters Patent No. 453,534, dated June 2, 1891.

Application filed February 3, 1891. Serial No. 380,025. (No model.)

*To all whom it may concern:*

Be it known that I, HIRAM BARKER, of St. Joseph, in the county of Buchanan and State of Missouri, have invented a new and useful Improvement in Gates, of which the following is a full, clear, and exact description.

My invention relates to an improvement in gates, especially to lifting farm-gates, and has for its object to provide a short, durable, and light gate, and a means whereby in the process of lifting the gate or opening the same the pivoted end will be made to counterbalance and at one point overbalance the free end, thus rendering the operation of opening the gate exceedingly convenient and expeditious.

A further object of the invention is to so construct the gate and its striking or jamb post that although the gate may be quite short a sufficient and properly-shaped opening will be obtained when the gate is thrown upward to permit of the ready passage of a large load of hay.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in both the views.

Figure 1:
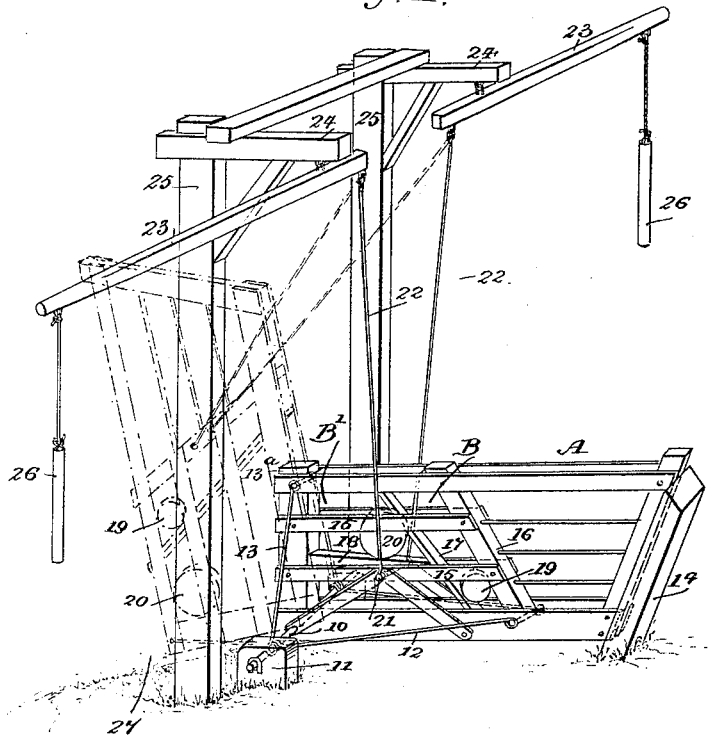
Figure 2:
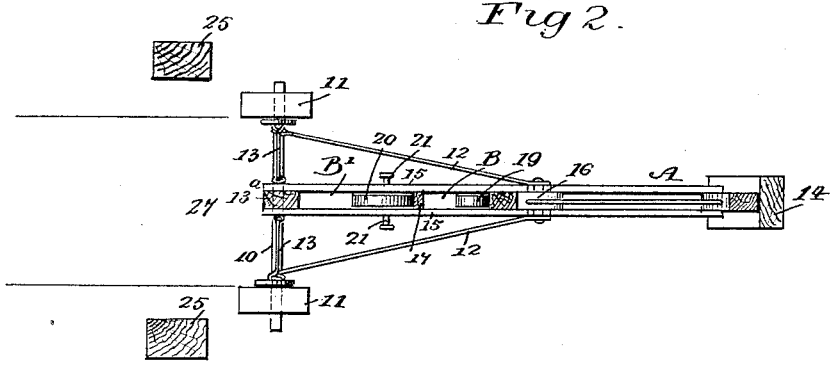

Figure 1 is a perspective view of the gate, illustrating the same in two positions; and Fig. 2 is a horizontal section taken above the movable weights of the gate.

The gate is pivoted at the lower portion of its rear end by means of a rod 10, which rod is journaled at its extremities in short blocks or posts 11, located one at each side of the opening to be closed by the gate.

The gate is preferably stayed and strengthened through the medium of two horizontal braces 12, one of which is secured to each side of the gate near the center of its lower portion, the opposite ends of the braces being attached to the pivoted rod 10. A vertical brace 13 is attached to the upper portion of the rear end of the gate at each side thereof, and the lower ends of the vertical braces are likewise secured to the pivot-rod 10. The jamb or striking post 14 is inclined outward at an angle of about forty or forty-five degrees, as illustrated in Fig. 1, and the free or forward end of the gate is correspondingly beveled to engage with the striking-post throughout the major portion of its length.

The gate A may be constructed of any suitable or approved material; but preferably the rear portion of the gate is double and the forward portion single. The top and bottom rails of the gate throughout its length are arranged in pairs, however, suitably spaced throughout the length of the gate. The slats 15, constituting the central portion of the double section of the gate, are horizontally arranged and are attached at their rear ends to the rear standard of the gate and at their forward ends to a diagonal standard 16, secured at its extremities between the upper and lower gate-rails.

A diagonal beam 17 extends downward from the top of the gate to the bottom at the rear of the diagonal standard 16, forming thereby an essentially V-shaped pocket B, and between the lower horizontal slats 15 a floor-beam 18 is laid, extending from the rear standard 13$^a$ of the gate to the diagonal beam 17, the upper face of the floor-beam being inclined downward in the direction of the forward or free end of the gate. The floor-beam 18 and diagonal beam 17 form an upper pocket B'. In the V-shaped pocket B a disk-weight 19 is inserted capable of rolling upon the beam 17 virtually from top to bottom of the gate, and in the pocket B' upon the inclined floor-beam 18 a larger disk-weight 20 is located. Between the rear standard of the gate and the intermediate inclined standard 16 pins 21 are preferably attached to the lower slats 15, or those between which the floor-beam is secured. Links 22 are connected at their lower ends with the pins 21, and the said links extend upward and are pivotally connected with the inner ends of levers 23, which levers, near their inner ends, are in turn pivotally connected with the bracket-bars 24 of posts 25, vertically arranged one at each side of the opening to be closed by the gate at the rear of the block or post in which the gate is pivoted. The bracket-bars 24 are usually connected by a brace-beam or its equivalent, and to the outer end of each lever 23 a pendent handle 26 is secured, preferably by a flexible connection, such as a rope or chain.

At the rear of the gate, between the posts 25, an inclined plane 27 is produced, the upper edge whereof is essentially flush with the ground or the threshold-strip beneath the gate, if such a strip is employed; or instead of the inclined plane 27 a ditch may be substituted; but the inclined plane is preferred.

In the operation of the gate to open the same either of the handles 26 is pulled downward, whereupon the links 22 are carried upward and with them the gate. The very moment that the gate is elevated a slight distance at its free end the large weight 20 rolls rearward upon its floor-beam 18 and virtually counterbalances the free end of the gate, and after the gate has been elevated about one-half its height the smaller weight 19 rolls to the upper end of its pocket, thereby more than counterbalancing the free end of the gate and causing the gate to be carried rearward to an upright position and slightly beyond an upright position, as shown in dotted lines, Fig. 1, the inclination of the gate when opened being permitted by the rear end of the gate resting upon the inclined plane 27. The inclination of the gate when elevated is the reverse of the striking-post 14; but the degree of inclination of the post and gate is essentially the same.

It will be observed that by reason of the rolling weights the gate may be expeditiously, conveniently, and easily elevated, and that by reason also of the formation of the striking-post and the provision of the inclined plane the space between the gate and the striking-post when the former is opened is wider at the top than at the bottom, thus permitting of a large load of hay being readily drawn through the opening without danger of striking the gate and thereby injuring it.

The gate is closed in the same manner in which it is opened—namely, by pulling downward upon the handles 26—and as the lower ends of the links 22 when the gate is opened are back of the pivotal point of the gate the gate will be thrown forward at its free or upper end, and as soon as moved in this direction the weights roll in their pockets toward the descending end of the gate, carrying the gate down to its normal or closed position.

Having thus described my invention, I claim as new and desire to secure by Letters Patent—

1. A gate pivoted at one end and provided with vertically and horizontally extending pockets arranged between its center and rear end, and movable weights located in the said pockets, substantially as shown and described.

2. The combination, with a gate pivoted at the lower portion of its rear end and provided with vertically and horizontally extending pockets between the center and rear end, of weights located in the pockets and capable of sliding or rolling therein, and lifting-levers connected with the gate, substantially as shown and described.

3. The combination, with a gate pivoted at the lower portion of its rear end and provided with pockets located between the center thereof and the pivoted end, one of the pockets being essentially V-shaped and extending diagonally from top to bottom of the gate, the other pocket being horizontally arranged near the center of the gate and provided with an inclined floor, of shifting weights located in said pockets, lifting-levers, and link conections between the lifting-levers and the gate, as and for the purpose specified.

4. The combination, with a lifting-gate and an inclined plane located back of the pivot of the gate, of a striking or jamb post inclined outward from the opening to be closed by the gate, substantially as shown and described, whereby when the gate is elevated the opening between the gate and its striking or jamb post will be wider at the top than at the bottom, as and for the purpose specified.

HIRAM BARKER.

Witnesses:
WILLIAM H. UTZ,
WILLIAM H. HAYNES.